US007174569B1

(12) United States Patent
Trostle

(10) Patent No.: US 7,174,569 B1
(45) Date of Patent: *Feb. 6, 2007

(54) CLIENT SECURITY FOR NETWORKED APPLICATIONS

(75) Inventor: Jonathan T. Trostle, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 401 days.

This patent is subject to a terminal disclaimer.

(21) Appl. No.: 10/790,975

(22) Filed: Mar. 1, 2004

Related U.S. Application Data

(63) Continuation of application No. 09/374,574, filed on Aug. 13, 1999, now Pat. No. 6,775,783.

(51) Int. Cl.
*H04L 9/00* (2006.01)
(52) U.S. Cl. .............................. 726/30; 726/6; 713/185
(58) Field of Classification Search ................... 726/30, 726/28, 29, 18
See application file for complete search history.

(56) References Cited

U.S. PATENT DOCUMENTS

| 5,944,824 | A | 8/1999 | He |
| 6,189,098 | B1 * | 2/2001 | Kaliski, Jr. ................. 713/168 |
| 6,349,338 | B1 | 2/2002 | Seamons et al. |
| 6,510,523 | B1 | 1/2003 | Perlman et al. |
| 6,775,783 | B1 * | 8/2004 | Trostle ........................... 726/6 |

* cited by examiner

*Primary Examiner*—Matthew Smithers
(74) *Attorney, Agent, or Firm*—Hickman Palermo Truong & Becker LLP

(57) ABSTRACT

Methods and apparatuses are provided for limiting access, by users of a networked computer system, to networked services on the computer system. More specifically, the present invention facilitates limiting access by other users to a first user's credential that can be used to facilitate access to networked services. A method includes authenticating a user, determining a credential for that user, and generating a corresponding random secret. The credential is stored in memory that can only be accessed through execution of a local security authority (LSA). The random secret is written to a secret file that is readable and writeable only by the user. When the user initiates an application, a security library associated with the application reads the random secret from the secret file and passes the secret to the LSA. The LSA identifies the credential corresponding to that secret and return a credential handle to the application client via the security library. The application client can use the credential handle to have the LSA use the credential on its behalf; in the Kerberos case, the LSA obtains GSSAPI Kerberos tokens and returns them to the application. The technique is also used in combination with the Unix setuid mechanism to allow one or more programs to have all of the user's network rights while all other programs have one of one or more subsets of the user's rights. Additional embodiments of the present invention also include computer readable medium with program instructions and a computer system configured to perform the above operations.

51 Claims, 5 Drawing Sheets

CLIENT SECURITY FOR NETWORKED APPLICATIONS

RELATED APPLICATION

This application is a continuation of and claims the benefit of priority to U.S. patent application Ser. No. 09/374,574, filed on Aug. 13, 1999, now U.S. Pat. No. 6,775,783, entitled "Client Security for Networked Applications", naming Jonathan T. Trostle as the inventor, the contents of which are incorporated herein by reference in its entirety for all purposes.

FIELD OF THE INVENTION

The present invention relates to computer security systems for networked applications. More specifically, the present invention relates to limiting access by one or more users to networked applications.

BACKGROUND OF THE INVENTION

Most computer systems currently in place are used by multiple users in parallel and/or serially. This includes networked computer systems that have two or more of computer processors, storage units, and/or other computer hardware, some of which can include various computer software. In addition to limiting access to the computer system itself, it is sometimes desirable for different users to have different rights or access to various applications or services on the network ("network services"). Such access control may be useful to maintain the integrity of the computer system, including that of resident data or programs. Such needs can become increasingly important and their solutions more complex as the number of users and/or size of the network increases.

Access to an application server or particular use of an application server can be limited by the application server requiring permission information associated with the application and the user invoking the application client. When the user invokes the application client, the permission information is passed to the application server. The application server evaluates the permission information to determine whether and/or how to proceed with the server functions. For example, in a web browser application, when the web browser client is invoked to access a requested URL via the web browser server, the permission information related to the user and the web browser client are passed to and used by the web browser server. The web browser server can use the permission information to make access control decisions, e.g., by evaluating whether the user has the permissions that are appropriate for accessing the requested URL. It can be appreciated, therefore, that when permission information associated with a first user is used by an application client when invoked by a second user, the second user may masquerade as the first user and gain access to information for which that second user does not have rights. Depending upon the permission information, the second user may be able to read, write, execute, or perform some other process with regard to information, when the second user does not have such predetermined rights.

Permission information or information from which the permission information can be determined, collectively called access information, can be stored in an access file in memory of the host computer system. Typically, an individual host computer of a computer network includes an operating system which can facilitate control of the host file system of files, including the access file. The file system can maintain the file permissions or access control lists (ACL's) of the various files located in memory of the host. Usually these permissions can be modified by the owner of the file or by another entity with appropriate rights. More particularly, such permissions and ACL's can include an identification of the user(s) that have permission to, for example, write to and/or read from the particular file. Thus, the file system can provide a measure of access control for such files under its purview. However, with some operating systems, techniques can be used by a user to gain access to the access file, and therefore to permission information, associated with any other user. Such users can then masquerade as other users and gain unauthorized access to information.

Accordingly, a security system and method is desired to provide increased access control to network applications and/or services by more effectively controlling access to network security credentials that allow users to authenticate to application servers. It is also desired to extend such access control to a per-process granularity on the user host computer system. In particular, it is desired that such security system require minimal complexity and minimal amount of change to an existing computer system, while maximizing allowable user access and access control flexibility. Such a system and method are implemented in conjunction with an operating system with which each process is prevented from accessing the memory associated with the operating system and the memory associated with other processes on the host computer system.

SUMMARY OF THE INVENTION

The foregoing and other needs that will become apparent from the following description, are achieved by the present invention which comprises, in one aspect, a computer-implemented method of limiting access to a credential that can facilitate access by a first user to a computer networked service on a networked computer system. The method includes receiving user information provided by the first user and storing the credential such that the credential is accessible only by using a local security authority. The method also includes generating a random secret value corresponding to the credential, and storing the random secret value in a secret file that can be modified and retrieved only by the first user.

In another embodiment, a computer readable medium containing program instructions for limiting access to a credential that can facilitate access by a first user to a computer networked service on a networked computer system, wherein when the computer readable medium is read by a computer system having a processor and memory the program instructions are configured to be executed by the processor. The computer readable medium includes program instructions for recognizing user information provided by the first user and program instructions for storing the credential such that the credential is accessible only by using a local security authority. The computer readable medium also includes program instructions for generating a random secret value corresponding to the credential, as well as program instructions for storing the random secret value in a secret file that can be modified and retrieved only by the first user.

In yet another embodiment, a computer system configured to limit access by users to networked services on a computer network includes a local security authority configured to authenticate the identity of a user, to determine a credential corresponding to the user, to generate a random secret value corresponding to the determined credential, and to determine authorization information associated with both the user and an application. The computer system also includes a local security authority memory associated with the local security authority, configured only by operation of the local security authority, as well as computer-readable memory configured to store a secret file which is configured to store the random secret value and which is readable substantially only by processes executed by the user.

BRIEF DESCRIPTION OF THE DRAWINGS

The present invention is illustrated by way of example, and not by way of limitation, in the figures of the accompanying drawings in which like reference numerals refer to similar elements and in which.

DETAILED DESCRIPTION OF THE PREFERRED EMBODIMENT

A system, method and apparatus for limiting access by a user to a networked application or service is described. In particular, access to network security credentials that allow a user to authenticate to application servers is more effectively controlled. This is accomplished by storing the user's credentials in memory that is only accessible by a local security authority (LSA). A secret associated with each credential is stored in a secret file which is accessible only by the associated user. When this secret is passed to the LSA by the user, the LSA passes back a handle to the appropriate credential, which the user can later use to obtain authentication information through the LSA. Thus, to access a credential, a user must conform with the file system access control to first access the secret, then conform with the LSA access control to obtain the credential handle.

In the following description, for the purposes of explanation, numerous specific details are set forth in order to provide a thorough understanding of the present invention. It will be apparent to one skilled in the art, however, that the present invention may be practiced without these specific details. In other instances, well-known structures and devices are shown in block diagram form in order to avoid unnecessarily obscuring the present invention.

Structural Overview

Figure 1:
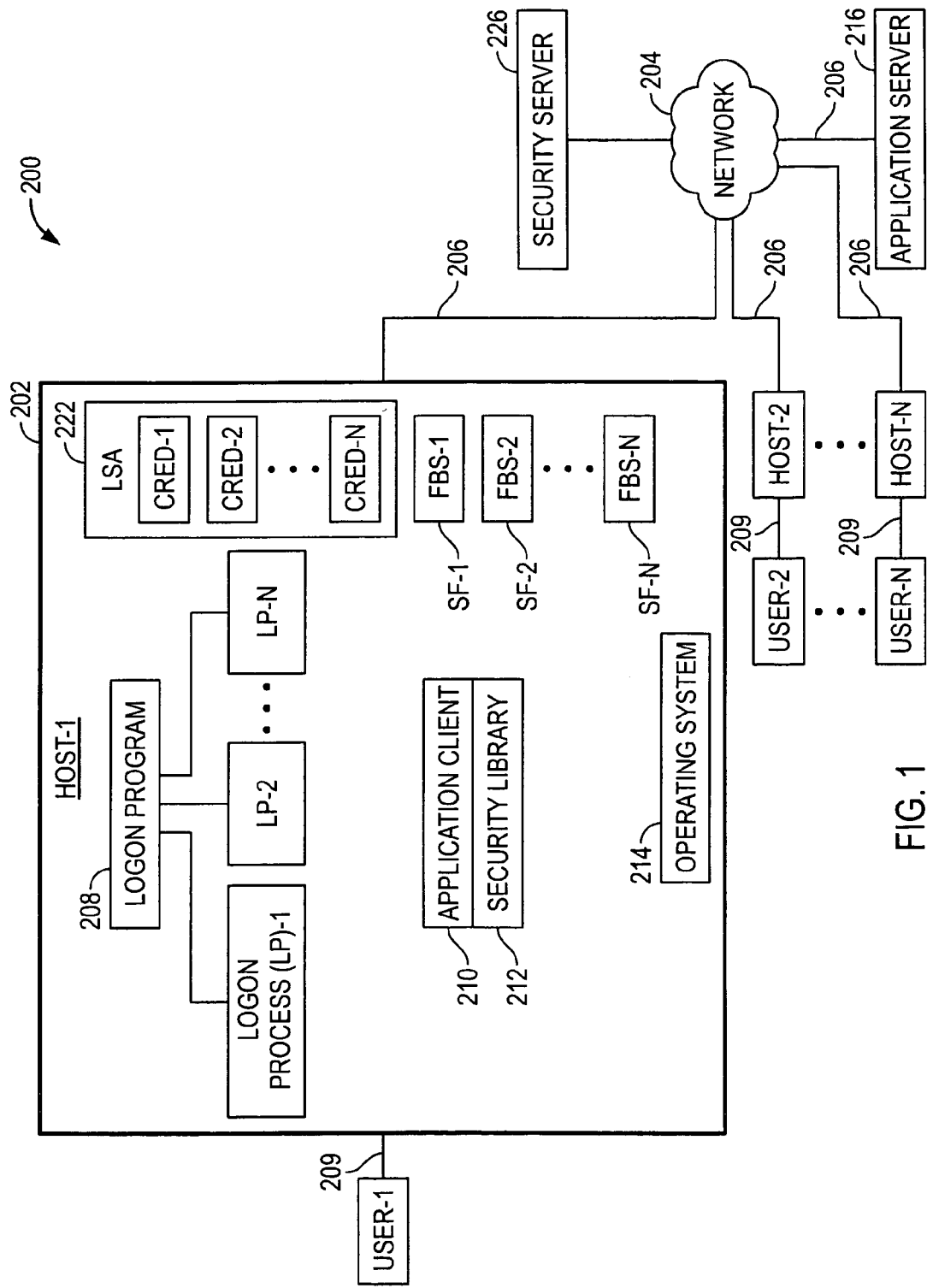
FIG. 1 is a schematic of a computer system, according to an embodiment of the present invention.

FIG. 1 is a schematic of a computer system 200 according to an embodiment of the present invention. A host 202 is connected to a network 204 via a transmission medium 206. The network 204 can include one or more local area networks (LANs) and/or wide area networks (WANs), including the Internet. The network 204 is configured to facilitate communication between the various hardware and software which are connected to it. The transmission medium 206 can include coaxial cables, copper wire, fiber optics, acoustic or light waves, such as those generated during radio-wave and infra-red data communications, and/or any other suitable medium for communicating data.

The host 202 can be, for example, a user terminal or machine including the components of the computer system 600 of FIG. 5 below. The host 202 includes an operating system (OS) 214 for managing the internal functions of the host 202, and controlling the host operations and file system. As an example, the OS 214 can be a Unix OS, examples of which are OS™ and SolariS™ by Sun Microsystems, Inc. of Palo Alto, Calif.; IRIX™ by Silicon Graphics, Inc. of Mountain View, Calif.; HPUX™ of Hewlett-Packard of Palo Alto, Calif.; or Linux. Included in its functions, the OS 214 controls access to files (not shown) that are resident on the host 202 and interactions by the host 202 with the network 204.

The host 202 also includes a logon program 208 which can be invoked by one or more users to initiate one or more corresponding logon processes LP-1 through LP-n. The logon processes LP-1 through LP-n operate interactively with the corresponding users to facilitate logon of the user to the host 202. Typically, a single user, here represented by USER-1, directly interacts with the host 202 through a direct interface 209. The direct interface can include a mouse, a keyboard, or any other suitable input device, such as those described below with reference to FIG. 5. In addition to the direct user USER-1, remote users USER-2 through USER-n can remotely log onto the host 202 via remote hosts HOST-2 through HOST-n that are connected to the host 202 via the network 204 and transmission media 206. As is well known in the art, the remote users USER-2 through USER-n can remotely log on via a direct interface 209 to a corresponding remote host HOST-2 through HOST-n, and then via a remote logon mechanism that provides data communication between the host 202 and the remote host HOST-2 through HOST-n. Any suitable remote logon mechanisms can be used, such as those commonly referred to as rlogin, telnet, or ssh. Each such remote logon by remote users USER-2 through USER-n can invoke a corresponding logon process LP-2 through LP-n on the host 202. In this way, multiple users can be logged onto and use the host 202 at substantially the same time.

The host 202 can also include an application service or client 210 and related security library 212. For example, the application client 210 can be a web browser or a directory browser. The network 204 is connected, via a transmission medium 206, to an application server 216 which is configured to act in response to requests from the application client 210 under certain conditions. Of course, host 202 can also include one or more other application clients (not shown) which can make requests to other application servers (not shown) connected to the network 204.

A local security authority (LSA) 222 is also included on the host 202. The LSA 222 can be a computer program or software resident on memory of the host 202. In alternative embodiments, the LSA 222 can reside on other memory that is associated with another host connected to the host 202 or that is associated with any other suitable hardware, with such memory being connected to the host 202 either directly or via the network 204. Processes of the LSA 222 can be performed independently from other processes by a processor (refer to FIG. 5 below) of the host 202 or any other suitable processor that is connected to the memory where the LSA 222 resides. Because the LSA operates as a separate process, other processes of the computer system 200 are substantially prohibited from accessing the memory of the LSA.

Memory associated with the LSA 222 includes one or more credentials CRED-1 through CRED-n which are associated with logged-on users USER-1 through USER-n, respectively. The credentials CRED-1 through CRED-n can be used to obtain authentication information that can be used to authenticate the user of an application client, such as application client 210, to an application server, such as application server 216. Because the credentials reside in the LSA which operates by separate processes, access to the credentials is limited to processes that first interact with the LSA itself.

The credentials CRED-1 through CRED-n each also correspond to file-based-secrets FBS-1 through FBS-n, respectively, which are located in secret files SF-1 through SF-n, respectively. The secret files SF-1 through SF-n can reside in memory of the host 202 or in memory otherwise connected to the host 202 through the network 204. Read and write access to the secret files SF-1 through SF-n can be limited to the user to which the credential corresponds, i.e., USER-1 through USER-n, respectively. To limit access in this way, the secret files SF-1 through SF-n are subject to a form of user-based access control, for example a file system of a host on which the secret files reside. Also, each secret file can have one or more characteristics which identify it as corresponding to the associated user. For example, the secret file can have a name that has a component that is common to all such secret files, and another component that corresponds to the user's user name, sometimes referred to as the user's userid.

A security server 226 is connected to the network 204 via transmission media 206. For example, the security server 226 can be utilize any suitable authentication system, such as a Kerberos system which is well known to those skilled in the art. The security server 226 can operate in response to requests by the LSA 222. In particular, and as further described below with respect to the process diagram of FIG. 2, the security server 226 can facilitate the determination of the credentials CRED-1 through CRED-n and the corresponding authentication information for a given application client.

Functional Overview

Figure 2:
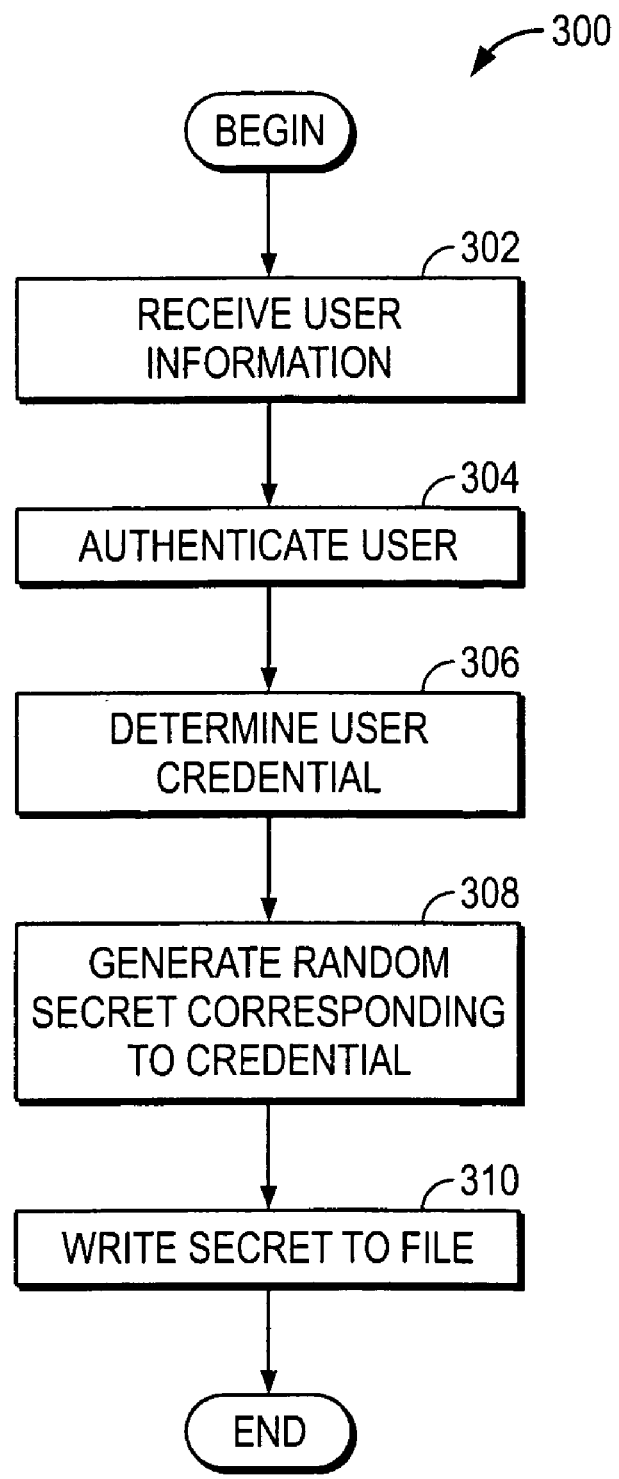
FIG. 2 is a process diagram of an aspect of a method for limiting access to an application by a user, according to an embodiment of the present invention.

FIG. 2 is a process diagram of a method 300 for producing a file-based-secret (FBS) as part of a method of limiting access of a user to a networked application. As an example, all or some of the operations of method 300 can be carried out by the LSA 222 of FIG. 1.

In operation 302, user information is received. This operation can occur substantially at the same time that a user or process logs onto the host 202, and at each such time a user or process logs on. The user information can include, for example, any information that identifies a process, a user, a group of users, or a particular capacity of a user or group of users. As a specific example, the user identification information can include a user name, a domain name, and a password. The user identification information can be entered into the computer system 300 through any suitable user interface, such as keyboard, mouse, etc. as discussed below with reference to FIG. 5. Such entry can also be performed in conjunction with one or more of a logon program, such as the logon program 208 of FIG. 1, and other hardware and/or software, for example smart cards. In particular, the logon program can interactively prompt the user for the user identification information. In a specific example, the logon program then passes the user information via an interprocess communication (IPC) channel to the LSA. In the case of a process logging onto the host 202, another suitable logon mechanism can be used to facilitate entry of the user information of the process attempting to log on and to transfer such information to the LSA.

The user corresponding to the user information is authenticated in operation 304. For example, it is determined whether the user is authorized to use the account identified by the user name, given the password received in operation. More specifically, the LSA can create a request using the user information of operation 302, and send such request to the security server. The security server can then pass a response to the LSA from which the LSA can determine whether the user is authenticated. This response can then be passed from the LSA to the logon program which can display the response to the user.

The user credential is determined in operation 306. This credential corresponds to the particular user whose user information was received in operation 302. The credentials can be determined, for example, by the LSA 222 engaging in an exchange, including using the user information, with the security server. More specifically, the exchange can be a Kerberos exchange, or an exchange governed by any other suitable authentication protocol.

In operation 308, a random secret that is correlated with the credential is generated. This random secret is provided in, or written to, a file that is readable and writeable only by the user to which the credential corresponds, in operation 310. Hence, a file-based-secret (FBS) is formed. As an example, the LSA can generate the random secret and place the random secret in the file. The file, or secret file, can have one or more characteristics which identify it as corresponding to the associated user. For example, the secret file can be created with a name that has a component that is common to all such secret files, and another component that corresponds to some user-specific information, such as the user's numeric uid in a Unix environment.

Figure 3:
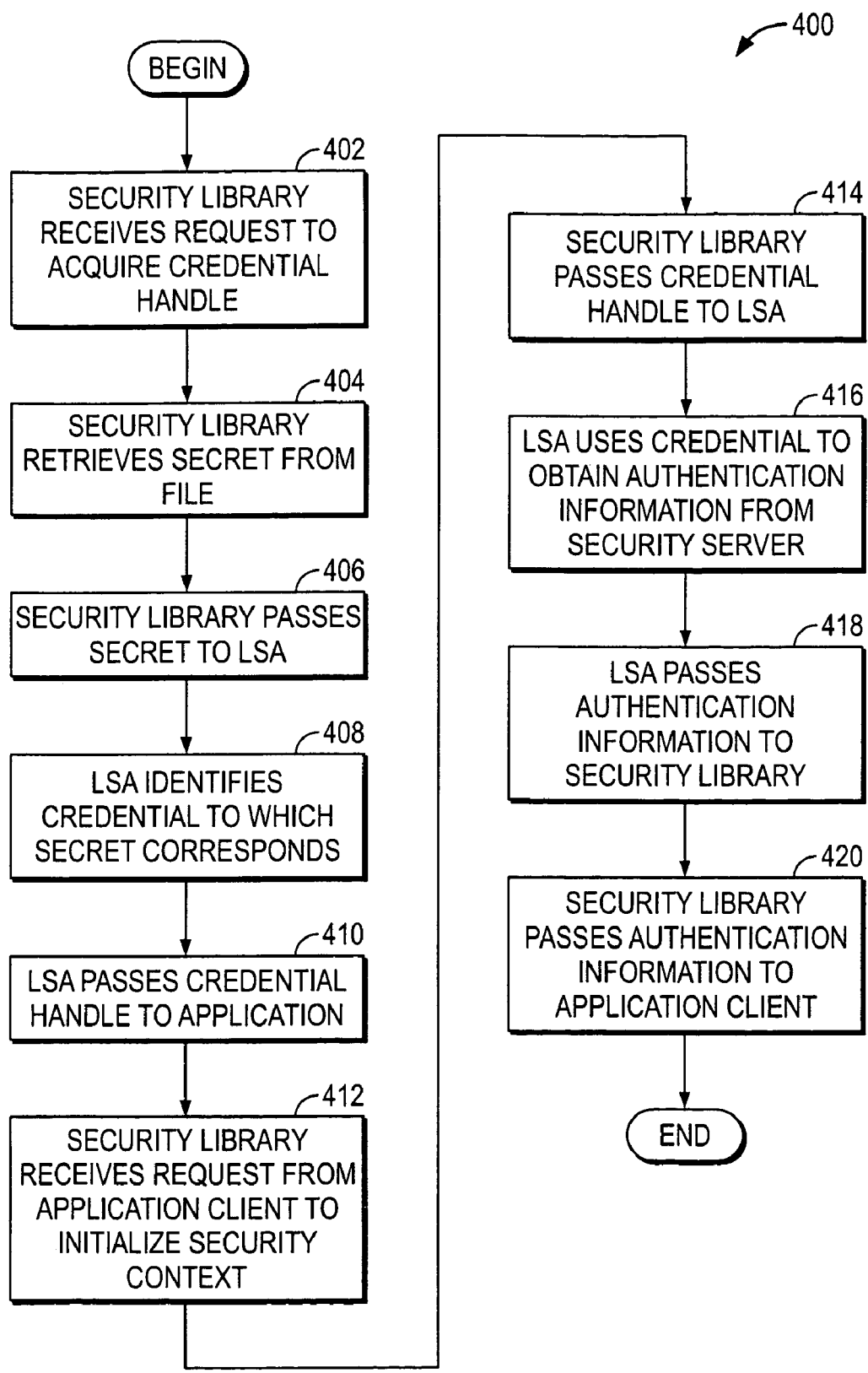
FIG. 3 is a process diagram of another aspect of a method for limiting access to an application by a user, according to an embodiment of the present invention.

A process diagram of a method 400 for using a file-based-secret to limit access to a networked application client or service is shown in FIG. 3. The method 400 includes a security library receiving a request to acquire a credential handle in operation 402 shown in FIG. 3. Such a request can be made by the application client associated with the security library, and initiated in response to a user ("the present user") invoking the application client or otherwise provoking the application client to attempt a connection to another entity on the network, such as the associated application server. For example, the present user can invoke a web browser on the host to access a web page that is linked to another web page that is currently displayed on the host. Thus, operation 402 can occur each time a user invokes a networked application.

The request of operation 402 can include one or more aspects of the user information, for example, the user's userid and/or uid. Alternatively, the security library can acquire the user information by calling the system operating system (OS).

In operation 404, the security library retrieves a secret from the secret file (described in FIG. 2), that corresponds to the present user. This retrieval is accomplished by correlating the user information received by the security library, with characteristics of the file that identify it as corresponding to the present user. For example, the security library can look for a file having a known common component and having another component that matches the userid acquired by the security library in operation 402.

The secret retrieved in operation 404 is passed to the LSA in operation 406 by the security library. The security library can pass the secret through an interprocess communication (IPC) channel, which can be opened, for example, by the security library before or as part of operation 404. In operation 408 the LSA identifies the credential to which the secret corresponds, according to the formation of the secret by the LSA in operation 308 of FIG. 2. The LSA then passes a credential identifier to the application client, via the security library, in operation 410. This credential identifier can be a handle or any other suitable type of information that the application client, through the security library, can later pass to the LSA and thereby facilitate identification of the appropriate credential by the LSA.

The security library receives a request from the application client to initialize a security context, in operation 412. This request includes passing the credential identifier, or handle, to the security library. In response to the application client request in operation 412, the security library passes the credential handle to the LSA in operation 414, shown in FIG. 3. In operation 416, the LSA uses the credential handle to identify the credential. Also in operation 416, the LSA uses the credential to obtain authentication information from the security server. For example, the LSA can initiate and conduct an exchange of information with the security server, including passing the credential to the security server and receiving the authentication information from the security server. In the particular example of a Kerberos security server, the LSA can use the credential to obtain a service ticket that includes a key and that corresponds to the present user, the application client requesting the security context, and/or the network service with which the application client is attempting to initialize a security context.

In operation 418, the LSA passes the authentication information to the security library. For example, in the example where the authentication information is a Kerberos ticket, the LSA can format and send to the security library a Generic Security Service Application Program Interface (GSSAPI) Kerberos initialize security context token (KISCT) containing the service ticket and an authenticator. In addition, the LSA can maintain a copy of the authentication information.

In operation 420 the security library passes the authentication information received in operation 418, to the application client. In subsequent operations, the application client can use the authentication information passed by the security library in operation 420, to attempt access to the related application server (i.e., authenticate the application client to the application server), and to thereby fulfill the user's invocation of the application client. Such subsequent operations by the application client and application server are well known to those skilled in the art. Operations 412 through 420 can be performed again to reestablish a security context with the same network service, or to establish a security context with a different network service.

Figure 4:
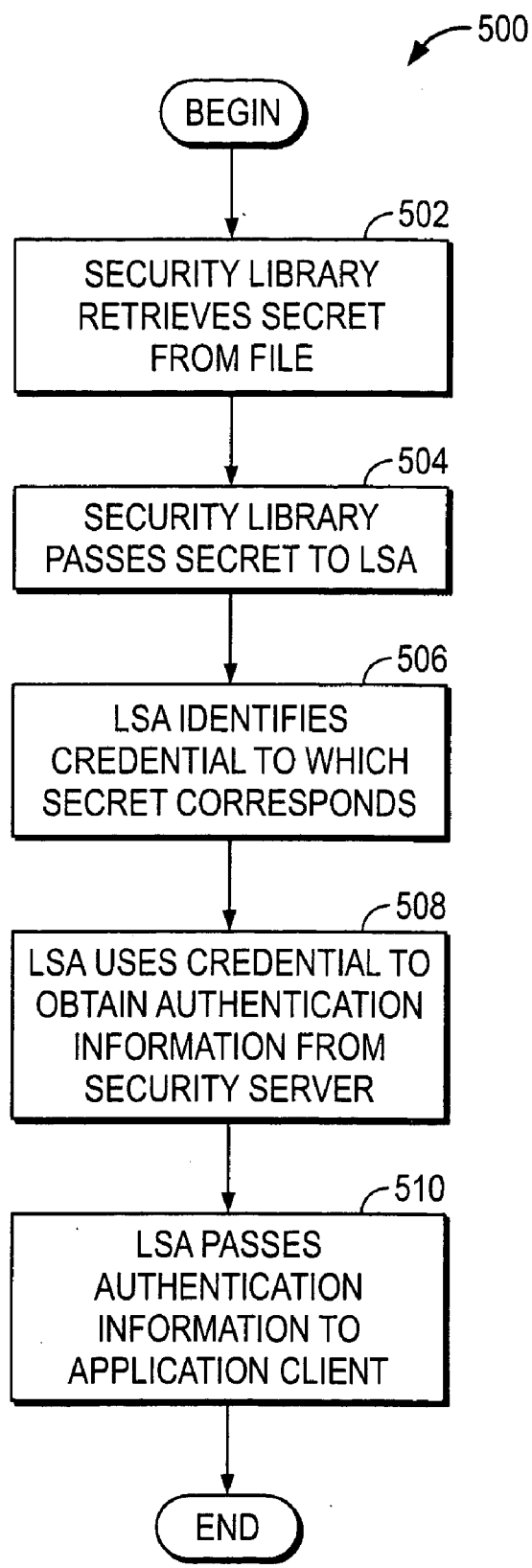
FIG. 4 is a process diagram of a method for limiting access to a networked application, according to an embodiment of the present invention.

FIG. 4 is a process diagram of a method 500 for limiting access to a networked application, according to an embodiment of the present invention. In operation 502 of method 500, a security library retrieves a secret from a file. The security library may perform operation 502 in response to a request from an application client that has been invoked by a present user. Such a request can be either directly or indirectly associated with initializing a security context for the application client. The file, or secret file, from which the secret is retrieved in operation 502 corresponds to and is readable and writeable by only the present user.

Operation 504 includes the security library passing the secret to an LSA. The LSA uses the secret passed in operation 504 to identify, in operation 506, a credential located in memory associated with the LSA processes. The LSA identifies the credential based on a predefined one-to-one correspondence with the secret.

In operation 508, the LSA uses the credential to obtain authentication information from a security server. Operation 508 can be similar and include the same or similar aspects as operation 416 of method 400 in FIG. 3. Also, the authentication information can be any suitable information that characterizes the authority the user has to invoke the application, such as a Kerberos ticket. The LSA then passes the authentication information to an application client that is associated with the security library of operation 502. In addition, the LSA can retain a copy of the authentication information in memory associated with the LSA processes. As discussed above with reference to FIG. 3, the application client can then use the authentication information to attempt connections within the network 200.

In this disclosure, including in the claims, certain process steps are set forth in a particular order, and alphabetic and alphanumeric labels are used to identify certain steps. Unless specifically stated in the disclosure, embodiments of the invention are not limited to any particular order of carrying out such steps. In particular, the labels are used merely for convenient identification of steps, and are not intended to imply, specify or require a particular order of carrying out such steps.

User-Level Access Control Advantages

With the various embodiments, access to networked applications or services can be more tightly controlled. More particularly, access to the credentials of the various users can be more controlled with inclusion of the LSA as described herein. While access to the file-based-secrets can be controlled by the file system of the host wherein the secret files reside, further access control is imposed by maintaining the credentials in the memory associated with the LSA processes. Because the application client never has direct access to the credential it cannot evade the LSA access control. Also, the application cannot send the credential off the host to be used later, and thereby evade the file system controls as well. In addition, because the user, through operation of the security library, must go through the LSA to acquire the credential, the LSA can again authenticate the user. Thus, this invention allows the LSA to implement a hardware-based security perimeter on a computer system implementing an operating system (OS) that enforces process isolation (i.e., one process cannot access the memory associated with another process), for example a Unix OS. All user access to credentials can be audited and checked at the time such access is requested, since every such access request must pass through the LSA. Thereby, the user-level access control to networked application clients and services is increased by the LSA and file-based-secret system aspects of the current invention.

Per Process Access Control

Additionally, the LSA can be configured to further scrutinize the user's request via the security library for the credential and thereafter the authentication information. For example, the LSA can be configured to evaluate additional characteristics of the user's request, such as the application client from which the request is being made. In such a case, the LSA could be used to provide access control to application clients on a per process basis, thereby providing a more fine-grained access control.

In an example of such an embodiment on a computer system implementing a UNIX operating system, the setuid mechanism is used. The goal is, when a trusted application, App-T, is invoked, to give it a full set of network privileges, e.g., group memberships, that are associated with the invoking user, for example User-1. When the LSA is invoked, it will create an FBS that is readable only by the account which owns the App-T executable. When a lesser-trusted application, App-G, is invoked by User-1, a subset of User-1's network privileges are given to the application App-G. In other words, a trusted application App-T will operate with a superset of User-1's group memberships, relative to the lesser-trusted applications. When User-1 logs on to the computer system, two sets of credentials are created. In addition, an FBS corresponding to the user (i.e., readable only by the user) is created, as in the previous discussion regarding per-user access control. The first credential includes all of User-1's group memberships, while the second credential has a subset of the group memberships. An exchange between the LSA and the security server, in addition to that described above, can be used to obtain the second credential associated with User-1. This scheme can be extended to multiple credentials corresponding to multiple applications, each with different access rights.

The workstation obtains the information regarding which credentials (and, e.g., with which group memberships) to obtain by consulting local policy. In the above case, the more powerful first credential (i.e., the credential which provides the greater amount of access) is associated with the FBS which is readable by the App-T account which owns the executable file of the trusted application App-T. When the security library attempts to acquire the handle of the appropriate credential, the LSA uses the ps command to determine whether the trusted application App-T is making the call. If so, the security library uses the setuid call to obtain and send to the LSA, the App-T FBS and the FBS corresponding to the user. The LSA then checks each of the trusted application's ancestor processes (using the ps command), for each copy of the trusted application, to ensure that these ancestor processes are not potentially malicious processes:

for each process with executable file equal to the trusted application executable file {
  for each ancestor process starting with the immediate parent {
    if ancestor process not trusted return bad status to security library for AcquireCredentialsHandle
    (list of trusted ancestor process executable files is obtained by consulting local policy)
  }
}

The LSA then returns a credential handle associated with the App-T credential. Of course there can be more than one identified trusted application and the lesser-trusted applications can have one of one or more subsets of the user's rights.

Such a security system can limit access to the application clients more precisely, thereby giving users the maximum authorized access while maintaining a higher degree of security. This improved limit of access to application clients therefore also results in improved limit of access to any other aspects of the computer system with which the application may interact. For example, if the application has the capability to affect a directory within the computer system, improving access control to the application can result in improved access control to the directory.

Multiple Users

While the above-described methods can be used with a single user, they can also be used with multiple users of the same computer system, and with multiple applications. In cases involving multiple users, the method 300 of FIG. 2 is performed for each user or process. Thus, there will be a separate credential for each user, with the credential corresponding to a separate secret in a separate file. The security library can access the particular file and obtain the particular resident secret that corresponds to the user that is attempting to access an application. The LSA can then determine the particular credential that corresponds to that particular secret, and eventually pass on the authentication information corresponding to the user and the particular invoked application client. Of course, the methods of FIG. 2 and FIG. 3 can be used in a computer system including one or more networked applications, while one or more of which are invoked by one or more users. Thus, these methods can facilitate enhancing security of the computer system with networked application clients and multiple users.

Hardware Overview

Figure 5:
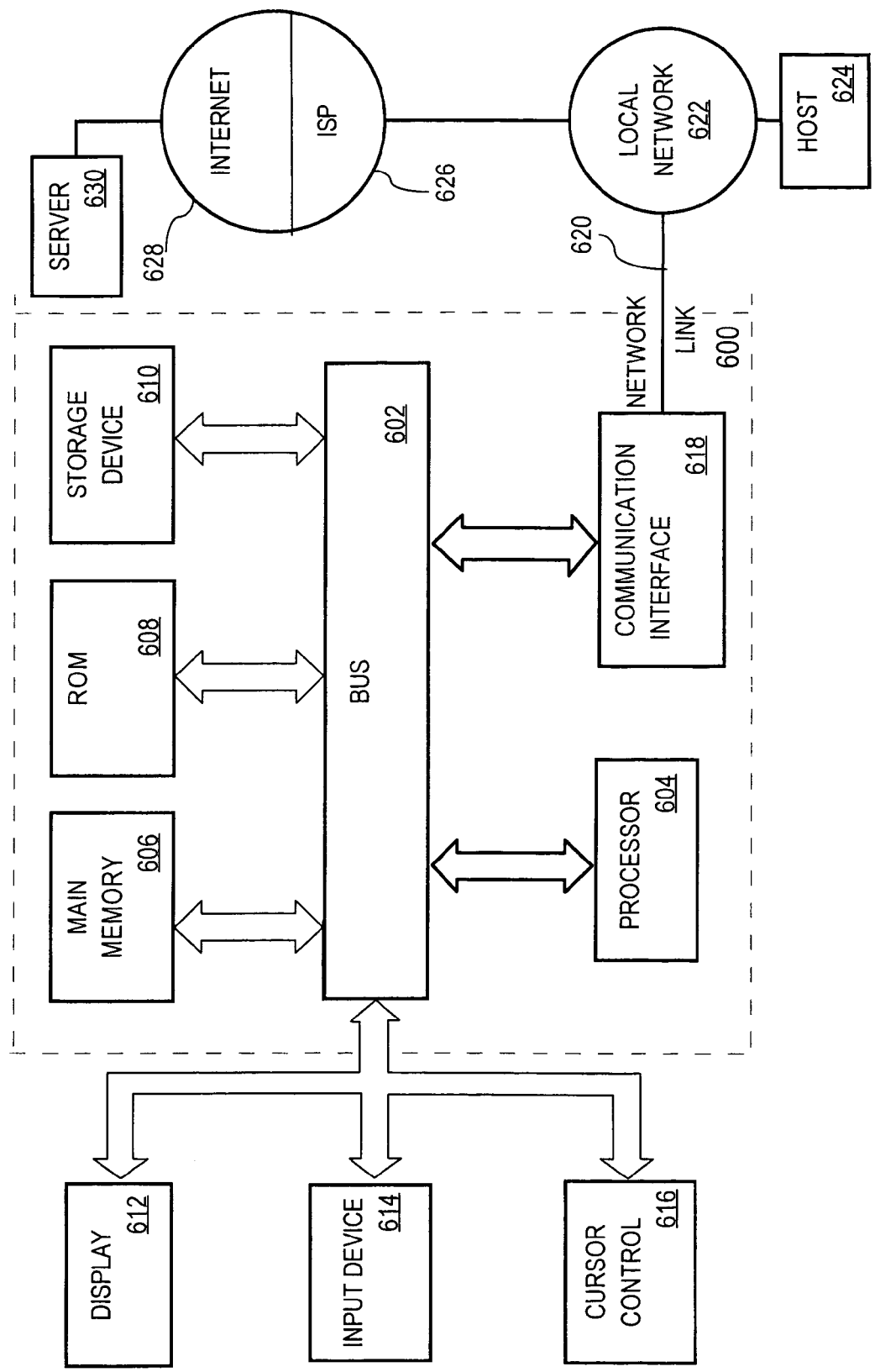
FIG. 5 is a schematic of an example computer system upon which an embodiment of the invention may be implemented.

FIG. 5 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

The invention is related to the use of computer system 100 for limiting user access to networked applications. According to one embodiment of the invention, application access security is provided by computer system 100 in response to processor 104 executing one or more sequences of one or more instructions contained in main memory 106. Such instructions may be read into main memory 106 from another computer-readable medium, such as storage device 110. Execution of the sequences of instructions contained in main memory 106 can cause processor 104 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that can participate in providing instructions to processor 104 for execution. Such a medium may take many forms, including but not limited to, non-volatile media, volatile media, and transmission media. Non-volatile media include, for example, optical or magnetic disks, such as storage device 110. Volatile media include dynamic memory, such as main memory 106. Transmission media include coaxial cables, copper wire and fiber optics, including the wires that comprise bus 102. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium; a CD-ROM, any other optical medium; punchcards, papertape, any other physical medium with patterns of holes; a RAM, a PROM, an EPROM, a FLASH-EPROM, any other memory chip or cartridge; a carrier wave as described hereinafter; or any other medium from which a computer can read.

Various forms of computer readable media may be involved in carrying one or more sequences of one or more instructions to processor 104 for execution. For example, the instructions may initially be carried on a magnetic disk of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector can receive the data carried in the infra-red signal and appropriate circuitry can place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 also includes a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the world wide packet data communication network now commonly referred to as the "Internet" 128. Local network 122 and Internet 128 both use electrical, electromagnetic and/or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120 and communication interface 118. In the Internet example, a server 130 might transmit a requested code for an application program through Internet 128, ISP 126, local network 122 and communication interface 118. In accordance with the invention, one such downloaded application provides for networked application security as described herein.

Processor 104 may execute the received code as it is received, and/or the received code can be stored in storage device 110 or other non-volatile storage for later execution. In this manner, computer system 100 may obtain application code in the form of a carrier wave.

In summary, the present invention provides methods and apparatuses for limiting access by users to networked services on a computer system, whereby greater security and access control can be realized while minimizing the computer system complexity. The present invention can be particularly useful where the user attempts access to a networked service through a host having a Unix-based operating system. Alternatively, the present invention can be implemented on host systems with a different operating system that prevents processes from accessing the memory of the operating system and the memory of other processes. The invention has been described herein in terms of several specific embodiments. Other embodiments of the invention, including alternatives, modifications, permutations and equivalents of the embodiments described herein, will be apparent to those skilled in the art from consideration of the specification, study of the drawings, and practice of the invention. For example, while the Local Security Authority (LSA), application client, and other elements of the computer system of the present invention have been described as located on a single host, alternatively these elements can be on one or more different hosts. The specification and drawings are, accordingly, to be regarded in an illustrative rather than a restrictive sense. The embodiments and specific features described above should be considered exemplary, with the invention being defined by the appended claims, which therefore include all such alternatives, modifications, permutations and equivalents as fall within the true spirit and scope of the present invention.

What is claimed is:

1. A method of providing client security for networked services, the method comprising the computer-implemented steps of:
   storing a credential such that the credential is accessible only by using a local security authority;
   generating a secret value corresponding to the credential; and
   storing the secret value in a secret file that can be modified and retrieved only by a first user.

2. A method as recited in claim 1, further comprising:
   receiving user information provided by the first user;
   authenticating the first user based, at least in part, on the user information;
   determining the credential based, at least in part, on the user information;
   associating the credential with the first user; and
   associating a credential identifier with the credential.

3. A method as recited in claim 2, wherein determining the credential includes using the local security authority to exchange information, including at least part of said user information, with a security server.

4. A method as recited in claim 2, wherein authenticating the first user includes exchanging information, representing at least a part of the user information, with a security server by using the local security authority.

5. A method as recited in claim 4, wherein exchanging information and determining the credential includes conducting a Kerberos exchange with a Kerberos security server whereby when information is passed from the local security authority to the Kerberos security server, the Kerberos security server determines the credential based, at least in part, on the information from the local security authority, and passes the credential to the local security authority.

6. A method as recited in claim 1, wherein generating and writing the secret value includes using the local security authority.

7. A method as recited in claim 2, further comprising:
  receiving a request to retrieve the credential;
  retrieving the secret value;
  retrieving the credential identifier, using the secret value; and
  retrieving the credential, using the credential identifier.

8. A method as recited in claim 7, further comprising:
  passing the credential identifier from the local security authority to an application client;
  receiving a request to initialize a security context;
  obtaining authentication information by using the local security authority and using the credential;
  passing the authentication information to a security library; and
  passing the authentication information from the security library to the application client, thereby facilitating initialization of the security context, wherein retrieving the credential includes identifying the credential that corresponds to the secret value and to the credential identifier by using the local security authority.

9. A method as recited in claim 7, wherein the secret value is retrieved only if the request to retrieve the credential is received from the first user.

10. A method as recited in claim 1, further comprising:
  retrieving the secret value from the secret file;
  passing the secret value to the local security authority;
  identifying the credential to which the secret value corresponds by using the local security authority to correlate a characteristic of the secret value with a characteristic of the credential;
  obtaining authentication information from a security server, using the credential and the local security authority; and
  passing authentication information from the local security authority to an application client, wherein the authentication information can operate with the application client to access a computer networked service.

11. A method as recited in claim 10, wherein retrieving and passing the secret value include using a security library to access the secret file, to read the secret value, and to communicate the secret value to the local security authority.

12. A method as recited in claim 10, wherein the method further comprises receiving user information provided by the first user; and wherein obtaining the authentication information includes exchanging information with the security server by using the local security authority to initiate communication with the security server, to pass at least part of the user information to the security server, and to receive authentication information from the security server.

13. A method as recited in claim 1, wherein the credential is associated with a first application and a set of permissions, and wherein the method further comprises:
  storing a second credential associated with a second application, in memory associated with the local security authority, wherein the second credential is associated with a subset of the set of permissions;
  generating a second secret value corresponding to the second credential;
  storing the second secret value in a second secret file; and
  limiting access to the second secret file to only the second application when invoked by the first user.

14. A method as recited in claim 13, further comprising:
  receiving a request from the second application to retrieve the second credential;
  retrieving the second secret value from the second secret file;
  passing the second secret value to the local security authority;
  confirming the request is from the second application;
  identifying the second credential to which the second secret value corresponds by using the local security authority to correlate a characteristic of the second secret value with a characteristic of the second credential;
  obtaining second authentication information from a security server, using the second credential and the local security authority; and
  passing the second authentication information from the local security authority to a second application client, wherein the second authentication information can operate with the second application client to access a computer networked service.

15. A computer readable storage medium containing program instructions for limiting access to a credential that can facilitate access by a first user to a computer networked service on a networked computer system, wherein when the computer readable medium is read by a computer system having a processor and memory the program instructions are configured to be executed by the processor, the computer readable medium comprising:
  program instructions for storing the credential such that the credential is accessible only by using a local security authority;
  program instructions for generating a secret value corresponding to the credential; and
  program instructions for storing the secret value in a secret file that can be modified and retrieved only by the first user.

16. A computer-readable storage medium as recited in claim 15, further comprising:
  program instructions for recognizing user information provided by the first user;
  program instructions for authenticating the first user based, at least in part, on the user information;
  program instructions for determining the credential based, at least in part, on the user information;
  program instructions for associating the credential with the first user; and
  program instructions for associating a credential identifier with the credential.

17. A computer readable storage medium as recited in claim 16, wherein the program instructions for determining the credential include program instructions for using the local security authority to exchange information, including at least part of the user information, with a security server.

18. A computer readable storage medium as recited in claim 16, further comprising:
   program instructions for recognizing a request to retrieve the credential;
   program instructions for retrieving the secret value;
   program instructions for retrieving the credential identifier, using the secret value;
   and program instructions for retrieving the credential, using the credential identifier.

19. A computer readable storage medium as recited in claim 18, further comprising:
   program instructions for passing the credential identifier from the local security authority to an application client;
   program instructions for receiving a request to initialize a security context;
   program instructions for obtaining authentication information by using the local security authority and using the credential;
   program instructions for passing the authentication information to a security library; and
   program instructions for passing the authentication information from the security library to the application client, thereby initializing the security context, wherein retrieving the credential includes identifying the credential that corresponds to the secret value and to the credential identifier, by using the local security authority.

20. A computer readable storage medium as recited in claim 15, further comprising:
   program instructions for retrieving the secret value from the file;
   program instructions for passing the secret value to the local security authority;
   program instructions for identifying the credential to which the secret value corresponds, by using the local security authority to correlate a characteristic of the secret value with a characteristic of the credential;
   program instructions for obtaining authentication information from a security server, using the credential and the local security authority; and
   program instructions for passing authentication information from the local security authority to an application client, wherein the authentication information can operate with the application client to access the computer networked service.

21. A computer system configured to provide client security for networked services, the computer system comprising:
   a local security authority configured to authenticate the identity of a user, to determine a credential corresponding to the user, to generate a secret value corresponding to the determined credential, and to determine authorization information associated with both the user and an application;
   local security authority memory associated with the local security authority, configured only by operation of the local security authority; and
   computer-readable memory configured to store a secret file which is configured to store the secret value and which is readable substantially only by processes executed by the user.

22. The computer system as recited in claim 21, further comprising:
   an application client configured to request processes from an application server; and
   a security library associated with the application client, wherein the security library is configured to receive a request from the application client to initiate a security context, to obtain the secret value by reading the secret file, to communicate the secret value to the local security authority, to obtain the authorization information from the local security authority, and to communicate the authorization information to the application client.

23. A computer system as recited in claim 21, wherein the local security authority is configured to authenticate the identity of the user, to determine the credential corresponding to the user, and to determine authorization information associated with both the user and an application by receiving user information and exchanging information, including information representing at least a part of the user information, with a security server.

24. An apparatus for providing client security for networked services, comprising:
   a network interface that is coupled to a data network for receiving one or more packet flows therefrom;
   a processor;
   one or more stored sequences of instructions which, when executed by the processor, cause the processor to carry out the steps of:
      storing a credential such that the credential is accessible only by using a local security authority;
      generating a secret value corresponding to the credential; and
      storing the secret value in a secret file that can be modified and retrieved only by a first user.

25. An apparatus as recited in claim 24, further comprising one or more stored sequences of instructions which, when executed by the processor, cause the processor to carry out the steps of:
   receiving user information provided by the first user;
   authenticating the first user based, at least in part, on the user information;
   determining the credential based, at least in part, on the user information;
   associating the credential with the first user; and
   associating a credential identifier with the credential.

26. An apparatus as recited in claim 25, wherein determining the credential includes using the local security authority to exchange information, including at least part of said user information, with a security server.

27. An apparatus as recited in claim 25, wherein authenticating the first user includes exchanging information, representing at least a part of the user information, with a security server by using the local security authority.

28. An apparatus as recited in claim 27, wherein exchanging information and determining the credential includes conducting a Kerberos exchange with a Kerberos security server whereby when information is passed from the local security authority to the Kerberos security server, the Kerberos security server determines the credential based, at least in part, on the information from the local security authority, and passes the credential to the local security authority.

29. An apparatus as recited in claim 24, wherein generating and writing the secret value includes using the local security authority.

30. An apparatus as recited in claim 25, further comprising one or more stored sequences of instructions which, when executed by the processor, cause the processor to carry out the steps of:
  receiving a request to retrieve the credential;
  retrieving the secret value;
  retrieving the credential identifier, using the secret value; and
  retrieving the credential, using the credential identifier.

31. An apparatus as recited in claim 30, further comprising one or more stored sequences of instructions which, when executed by the processor, cause the processor to carry out the steps of:
  passing the credential identifier from the local security authority to an application client;
  receiving a request to initialize a security context;
  obtaining authentication information by using the local security authority and using the credential;
  passing the authentication information to a security library; and
  passing the authentication information from the security library to the application client, thereby facilitating initialization of the security context, wherein retrieving the credential includes identifying the credential that corresponds to the secret value and to the credential identifier by using the local security authority.

32. An apparatus as recited in claim 30, wherein the secret value is retrieved only if the request to retrieve the credential is received from the first user.

33. An apparatus as recited in claim 24, further comprising one or more stored sequences of instructions which, when executed by the processor, cause the processor to carry out the steps of:
  retrieving the secret value from the secret file;
  passing the secret value to the local security authority;
  identifying the credential to which the secret value corresponds by using the local security authority to correlate a characteristic of the secret value with a characteristic of the credential;
  obtaining authentication information from a security server, using the credential and the local security authority; and
  passing authentication information from the local security authority to an application client, wherein the authentication information can operate with the application client to access a computer networked service.

34. An apparatus as recited in claim 33, wherein retrieving and passing the secret value include using a security library to access the secret file, to read the secret value, and to communicate the secret value to the local security authority.

35. An apparatus as recited in claim 33, further comprising one or more stored sequences of instructions which, when executed by the processor, cause the processor to carry out the step of receiving user information provided by the first user; and wherein obtaining the authentication information includes exchanging information with the security server by using the local security authority to initiate communication with the security server, to pass at least part of the user information to the security server, and to receive authentication information from the security server.

36. An apparatus as recited in claim 24, wherein the credential is associated with a first application and a set of permissions, and wherein the apparatus further comprises one or more stored sequences of instructions which, when executed by the processor, cause the processor to carry out the steps of:
  storing a second credential associated with a second application, in memory associated with the local security authority, wherein the second credential is associated with a subset of the set of permissions;
  generating a second secret value corresponding to the second credential;
  storing the second secret value in a second secret file; and
  limiting access to the second secret file to only the second application when invoked by the first user.

37. An apparatus as recited in claim 36, further comprising one or more stored sequences of instructions which, when executed by the processor, cause the processor to carry out the steps of:
  receiving a request from the second application to retrieve the second credential;
  retrieving the second secret value from the second secret file;
  passing the second secret value to the local security authority;
  confirming the request is from the second application;
  identifying the second credential to which the second secret value corresponds by using the local security authority to correlate a characteristic of the second secret value with a characteristic of the second credential;
  obtaining second authentication information from a security server, using the second credential and the local security authority; and
  passing the second authentication information from the local security authority to a second application client, wherein the second authentication information can operate with the second application client to access a computer networked service.

38. An apparatus providing client security for networked services, comprising:
  means for storing a credential such that the credential is accessible only by using a local security authority;
  means for generating a secret value corresponding to the credential; and
  means for storing the secret value in a secret file that can be modified and retrieved only by a first user.

39. An apparatus as recited in claim 38, further comprising:
  means for receiving user information provided by the first user;
  means for authenticating the first user based, at least in part, on the user information;
  means for determining the credential based, at least in part, on the user information;
  means for associating the credential with the first user; and
  means for associating a credential identifier with the credential.

40. An apparatus as recited in claim 39, wherein determining the credential includes using the local security authority to exchange information, including at least part of said user information, with a security server.

41. An apparatus as recited in claim 39, wherein authenticating the first user includes exchanging information, representing at least a part of the user information, with a security server by using the local security authority.

42. An apparatus as recited in claim 41, wherein exchanging information and determining the credential includes conducting a Kerberos exchange with a Kerberos security server whereby when information is passed from the local security authority to the Kerberos security server, the Kerberos security server determines the credential based, at least in part, on the information from the local security authority, and passes the credential to the local security authority.

43. An apparatus as recited in claim 38, wherein generating and writing the secret value includes using the local security authority.

44. An apparatus as recited in claim 39, further comprising:
   means for receiving a request to retrieve the credential;
   means for retrieving the secret value;
   means for retrieving the credential identifier, using the secret value; and
   means for retrieving the credential, using the credential identifier.

45. An apparatus as recited in claim 44, further comprising:
   means for passing the credential identifier from the local security authority to an application client;
   means for receiving a request to initialize a security context;
   means for obtaining authentication information by using the local security authority and using the credential;
   means for passing the authentication information to a security library; and
   means for passing the authentication information from the security library to the application client, thereby facilitating initialization of the security context, wherein retrieving the credential includes identifying the credential that corresponds to the secret value and to the credential identifier by using the local security authority.

46. An apparatus as recited in claim 44, wherein the secret value is retrieved only if the request to retrieve the credential is received from the first user.

47. An apparatus as recited in claim 38, further comprising:
   means for retrieving the secret value from the secret file;
   means for passing the secret value to the local security authority;
   means for identifying the credential to which the secret value corresponds by using the local security authority to correlate a characteristic of the secret value with a characteristic of the credential;
   means for obtaining authentication information from a security server, using the credential and the local security authority; and
   means for passing authentication information from the local security authority to an application client, wherein the authentication information can operate with the application client to access the computer networked service.

48. An apparatus as recited in claim 47, wherein retrieving and passing the secret value include using a security library to access the secret file, to read the secret value, and to communicate the secret value to the local security authority.

49. An apparatus as recited in claim 47, further comprising a means for receiving user information provided by the first user; and wherein obtaining the authentication information includes exchanging information with the security server by using the local security authority to initiate communication with the security server, to pass at least part of the user information to the security server, and to receive authentication information from the security server.

50. An apparatus as recited in claim 38, wherein the credential is associated with a first application and a set of permissions, and wherein the apparatus further comprises:
   means for storing a second credential associated with a second application, in memory associated with the local security authority, wherein the second credential is associated with a subset of the set of permissions;
   means for generating a second secret value corresponding to the second credential;
   means for storing the second secret value in a second secret file; and
   means for limiting access to the second secret file to only the second application when invoked by the first user.

51. An apparatus as recited in claim 50, further comprising:
   means for receiving a request from the second application to retrieve the second credential;
   means for retrieving the second secret value from the second secret file;
   means for passing the second secret value to the local security authority;
   means for confirming the request is from the second application;
   means for identifying the second credential to which the second secret value corresponds by using the local security authority to correlate a characteristic of the second secret value with a characteristic of the second credential;
   means for obtaining second authentication information from a security server, using the second credential and the local security authority; and
   means for passing the second authentication information from the local security authority to a second application client, wherein the second authentication information can operate with the second application client to access a computer networked service.

* * * * *